July 11, 1939.    P. A. GREENE    2,165,926
FAUCET ATTACHMENT
Filed July 6, 1938
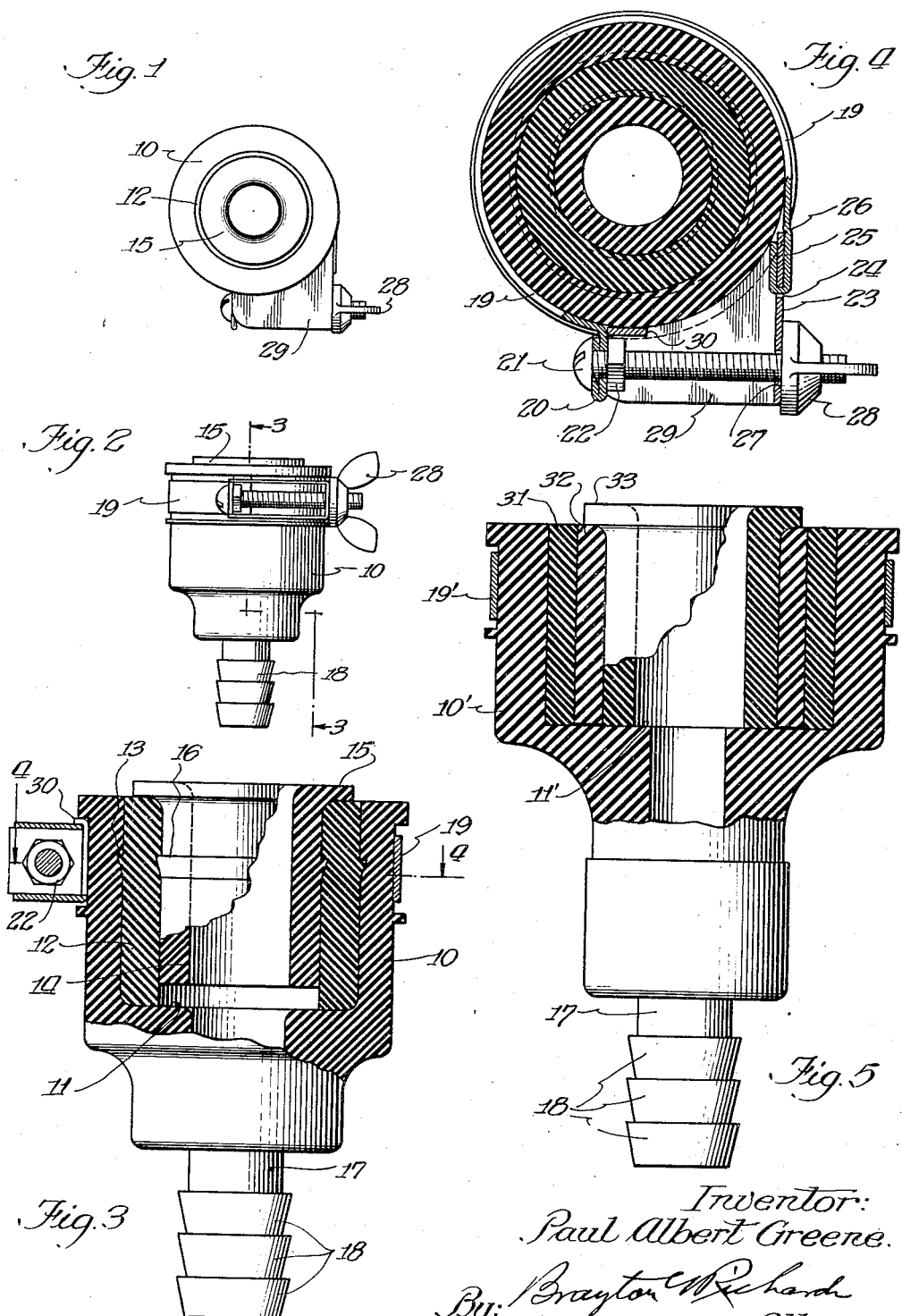
Inventor:
Paul Albert Greene.
By: Brayton Richards
Attorney.

Patented July 11, 1939

2,165,926

UNITED STATES PATENT OFFICE 2,165,926

FAUCET ATTACHMENT

Paul Albert Greene, Venice, Calif.

Application July 6, 1938, Serial No. 217,812

1 Claim. (Cl. 285—90)

The invention relates to improvements in faucet attachments especially adapted for connecting sections of hose therewith, the primary object of the invention being to provide a simple and economical attachment of the character indicated so constructed and arranged as to permit the attachment thereof to faucets of various sizes.

Other objects will appear hereinafter.

The invention consists in the combinations and arrangements of parts hereinafter described and claimed.

The invention will be best understood by reference to the accompanying drawing forming a part of this specification and in which Fig. 1 is a top plan view of an attachment embodying the invention;

Fig. 2 a side view of the same;

Fig. 3 an enlarged section taken substantially on line 3—3 of Fig. 2;

Fig. 4 a section taken substantially on line 4—4 of Fig. 3; and

Fig. 5 a view similar to Fig. 3, but showing a slightly modified form of construction.

The embodiment of the invention illustrated in Figs. 1, 2, 3, and 4 comprises an outer flexible rubber casing 10 having a socket 11 in the upper portion thereof. A flexible tubular rubber insert 12 is arranged to fit snugly within the socket 11 to rest against the bottom thereof, as shown. The insert 12 is provided with an annular downwardly tapering ring or shoulder 13 arranged to fit as shown into a correspondingly shaped groove in the wall of the casing 10 thereby interlocking said insert with said casing. Another flexible tubular rubber insert 14 fits snugly within the insert 12 as shown, and is provided with a supporting flange 15 at its top resting against the top of the insert 12. Insert 14 may also be provided with an interlocking shoulder 16 interlocking with a similarly shaped groove in the inner wall of the insert 12 as indicated. At its bottom the casing 10 is provided with a central discharge nipple 17 having three sharply pitched downwardly tapering securing rings or fins 18 adapted to be inserted in the end of a section of hose for connection with a faucet. The sharpness of the pitch of the shoulders 18 facilitates insertion thereof in the hose section and also insures maximum grip or engagement therewith.

A clamping band 19, preferably of spring steel is arranged as shown to surround the upper portion of the casing 10. One end 20 of said band is extended substantially radially, doubled upon itself and provided with a central perforation for the passage of a clamping screw 21 secured thereto by a clamping nut 22, as shown. A clamping bracket is secured to the other end of band 19, said bracket comprising a wall 23 provided with a perforation 24 through which the end 25 of the band 19 is secured as shown, there being a bend 26 in the band 19 to cause substantial tangential relation and secure close fit of the band to the casing 10. At its outer end the wall 23 is perforated for the passage of the clamping screw 21 and a wing nut 28 is arranged on said screw to tighten the band around the casing. The wall 23 is provided with side walls 29 slidably embracing the screw 21 and radial end 20 as shown. One of the side walls 29 is provided with a cross bar 30 extending under the other side wall 29 and having its end turned up to engage the same to prevent spreading of the side walls 29 in use. By this arrangement a simple and effective clamping member is provided for use in clamping the attachment on a faucet.

In use the attachment is adjusted to the size of the faucet to which it is to be attached by inserting or removing one or more of the inserts 12 and 14 and secured in place by means of the clamp as will be readily understood.

In the form of construction illustrated in Fig. 5, the casing 10' is somewhat larger than the casing illustrated in the other views and the socket 11' and clamping band 19' are also correspondingly increased in size. Otherwise these parts are precisely the same in construction and operation as those already described.

In this instance, three rubber inserts, 31, 32, and 33 are shown as inserted in the socket 11' thus affording a wider range of adjustment to different sizes of faucets. Otherwise the construction and arrangement is identical with that already described.

While I have illustrated and described the preferred forms of construction for carrying the invention into effect, these are capable of variation and modification without departing from the spirit of the invention. I therefore do not wish to be limited to the precise details disclosed, but desire to avail myself of such variations and modifications as fall within the scope of the appended claim.

I claim:

A clamp of the class described comprising a flexible circular clamping band having one end extended radially and perforated; a tangentially arranged clamping screw passing through said perforation and secured to said radial end by a nut thereon; a bracket comprising an end wall tangentially secured to the other end of said band and provided with circumferentially extending side walls slidably embracing said screw and said radial end, the secured end of said bracket being perforated for the passage of said screw; a cross bar on the inner edge of one of said side walls, extending across the gap between them and having its end turned up and engaging said other side wall; and a nut on the end of said screw.

PAUL ALBERT GREENE.